US009657753B2

(12) United States Patent
Luo et al.

(10) Patent No.: US 9,657,753 B2
(45) Date of Patent: May 23, 2017

(54) MASTER CYLINDER ASSEMBLY IN BRAKE SYSTEM

(75) Inventors: Dongqiang Luo, Shanghai (CN); Richard J. Kriz, II, Fort Wayne, IN (US)

(73) Assignee: BWI (Shanghai) Co., Ltd., Shanghai (CN)

( * ) Notice: Subject to any disclaimer, the term of this patent is extended or adjusted under 35 U.S.C. 154(b) by 184 days.

(21) Appl. No.: 14/126,980

(22) PCT Filed: Jun. 17, 2011

(86) PCT No.: PCT/CN2011/075847
§ 371 (c)(1),
(2), (4) Date: Dec. 17, 2013

(87) PCT Pub. No.: WO2012/171211
PCT Pub. Date: Dec. 20, 2012

(65) Prior Publication Data
US 2014/0165554 A1 Jun. 19, 2014

(51) Int. Cl.
| B60T 11/20 | (2006.01) |
| F15B 15/02 | (2006.01) |
| B60T 11/236 | (2006.01) |
| B60T 11/232 | (2006.01) |
| B60T 11/16 | (2006.01) |

(52) U.S. Cl.
CPC .............. *F15B 15/02* (2013.01); *B60T 11/16* (2013.01); *B60T 11/20* (2013.01); *B60T 11/232* (2013.01); *B60T 11/236* (2013.01)

(58) Field of Classification Search
CPC ........ B60T 11/232; B60T 11/16; B60T 11/20; B60T 11/203; F15B 15/02
See application file for complete search history.

(56) References Cited

U.S. PATENT DOCUMENTS

| 7,168,536 B2 | 1/2007 | Feigel |
| 8,347,622 B2 | 1/2013 | Ogiwara et al. |

(Continued)

FOREIGN PATENT DOCUMENTS

| CN | 2758139 Y | 2/2006 |
| CN | 2928612 Y | 8/2007 |

(Continued)

OTHER PUBLICATIONS

Chinese Office Action & English Translation, Dated Jan. 14, 2016, 16 Pages.

(Continued)

*Primary Examiner* — Eric Keasel
*Assistant Examiner* — Abiy Teka
(74) *Attorney, Agent, or Firm* — William H. Honaker; Dickinson Wright PLLC

(57) ABSTRACT

A master cylinder assembly of the type comprises a housing (20) disposed along an axis (A) defining a chamber (22) having a cylindrical shape extending horizontally between an open end and a closed end. A first cylinder (42) and a second cylinder (44) are disposed for sliding movement axially along the axis. Each of the cylinders includes a cylindrical wall (48) defining a cylindrical bore (52). A piston (56) is disposed in each of the cylindrical bores. The cylindrical wall of each cylinder includes a cylinder ramp (70) to define a cylinder ramp shoulder (74). Each piston includes a piston ramp (76) to define a piston ramp shoulder (80). The piston ramp shoulder (80) of each piston and the cylinder ramp shoulder (74) of each cylinder radially engage one another in an assembled position to allow the cylinders (42, 44) and the pistons (56) to abut one another during the sliding movement axially along the axis within the chamber of the housing.

16 Claims, 1 Drawing Sheet

(56) References Cited

U.S. PATENT DOCUMENTS

| | | |
|---|---|---|
| 2004/0011614 A1 | 1/2004 | Feigel |
| 2005/0198954 A1* | 9/2005 | Konig ................... B60T 11/20 60/562 |
| 2009/0212621 A1* | 8/2009 | Drott ........................ B60T 8/38 303/14 |
| 2009/0241768 A1 | 10/2009 | Ogiwara et al. |

FOREIGN PATENT DOCUMENTS

| | | |
|---|---|---|
| CN | 101332811 | 12/2008 |
| CN | 201300831 | 9/2009 |
| CN | 201300831 Y * | 9/2009 |
| CN | 201659972 U | 12/2010 |
| CN | 201800705 U | 4/2011 |
| DE | 19903014 | 8/2000 |
| KR | 1020090050498 A | 5/2009 |
| KR | 20100084770 | 7/2010 |
| KR | 20100084770 A | 7/2010 |
| WO | 2011043069 | 4/2011 |
| WO | 2011043069 A1 | 4/2011 |

OTHER PUBLICATIONS

The State Intellectual Property Office of China; Office Action; Dated Jul. 5, 2016; 10 Pages.
The Korean Intellectual Property Offie Notice of Office Action; Dated Aug. 31, 2016; 17 Pages.

\* cited by examiner

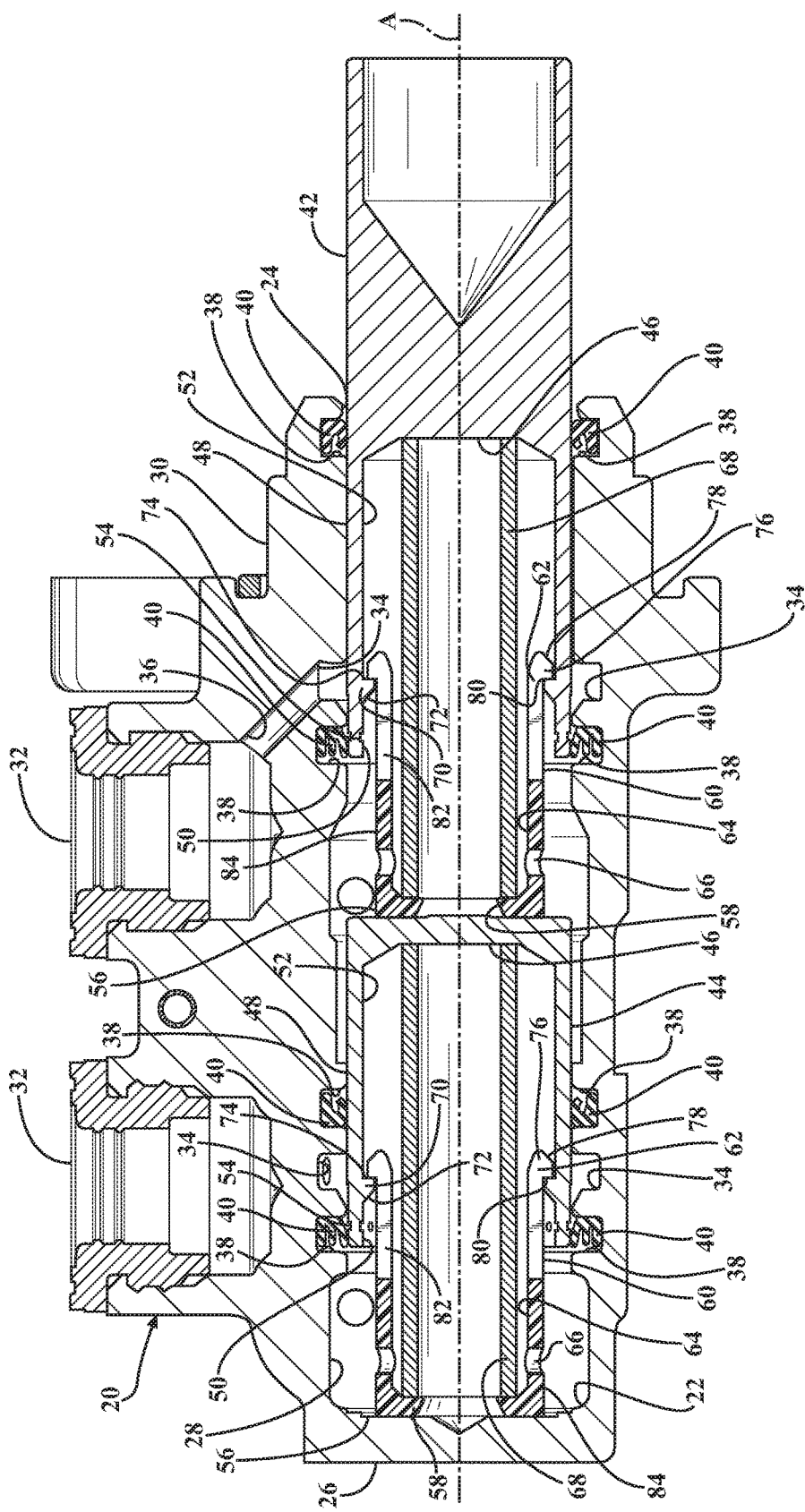

MASTER CYLINDER ASSEMBLY IN BRAKE SYSTEM

BACKGROUND OF THE INVENTION

1. Field of the Invention

The present invention relates generally to a master cylinder in a brake system of a vehicle.

2. Description of the Prior Art

A master cylinder assembly in a brake system which the subject invention pertains, includes a housing disposed along an axis defining a chamber extending horizontally between an open end and a closed end to define a wall extending annularly in the chamber. A cylinder is disposed for sliding movement axially along the axis in the chamber including a cylindrical wall extending axially to an open distal end. A piston including a piston wall extending cylindrically and axially from the end portion to a distal end. One such assembly is disclosed in U.S. Pat. No. 7,168,536 to Feigel.

It is long recognized that assembling a master cylinder assembly in a brake system requires many additional components, e.g., screws, pins, and/or spring seats. The additional parts and their design can make the master cylinder assembly process more complex and costly. It is desirable to provide a master cylinder design that is less costly and easier to assemble.

SUMMARY OF THE INVENTION

The invention provides such master cylinder assembly for a brake system wherein the cylindrical wall of the cylinders includes a cylinder ramp presenting a first frusto-conical surface extending annularly about the cylindrical wall of the cylinders to define a cylinder ramp shoulder. In addition, the piston wall includes a piston ramp presenting a second frusto-conical surface extending annularly about said piston wall to define a piston ramp shoulder. The first frusto-conical surfaces of the cylinder and the second frusto-conical surface of the piston slidably engage one another to radially compress the distal end of the piston and snap into an assembled position. The piston ramp shoulder and the cylinder ramp shoulder radially engage one another in the assembled position to limit the axial movement of the piston relative to the cylinder.

The cylinder ramp of the cylinder and the piston ramp of the piston allow the master cylinder assembly in a brake system to be assembled by a simple snap-in engagement thereby reducing the cost and the parts required for the assembly.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a cross sectional view of the an embodiment of the master cylinder assembly in a brake system constructed in accordance with the subject invention.

DETAILED DESCRIPTION OF THE ENABLING EMBODIMENTS

Referring to the FIGURES, wherein like numerals indicate corresponding parts throughout the several views, a master cylinder assembly in a brake system is generally shown in FIG. 1.

A housing 20, as generally indicated, is disposed along an axis A defining a chamber 22 having a cylindrical shape extending horizontally between an open end 24 and a closed end 26 to define a wall 28 extending annularly in the chamber 22 of the housing 20. The housing 20 defines a top 30 including a plurality of fluid reservoirs 32.

The wall 28 of the housing 20 defines a plurality of annular recesses 34. The top 30 of the housing 20 defines a fluid channel 36 interconnecting each of the annular recesses 34 to the fluid reservoir 32 for facilitating fluid flow between each of the fluid reservoirs 32 and the chamber 22. The wall 28 of the housing 20 includes a plurality of sealing grooves 38 disposed and spaced annularly along the wall 28. An annular seal 40 is disposed in each of the grooves 38.

A first cylinder 42 and a second cylinder 44 are disposed for sliding movement axially along the axis A and slidably in the chamber 22 in an end-to-end relationship. Each of the cylinders 42, 44 includes a spring seat 46 and a cylindrical wall 48 extending outwardly from the spring seat 46 to an open distal end 50 defining a cylindrical bore 52 extending between the spring seat 46 and the cylindrical wall 48 wherein the cylindrical wall 48 of the cylinders 42, 44 is in communication with the wall 28 of the housing 20. The cylindrical wall 48 of each the cylinders 42, 44 defines a plurality of fluid flow apertures 54 for facilitating fluid flow. Alternatively, instead of having two cylinders 42, 44, a single cylinder can be disposed for sliding movement axially along the axis A and slidably in the chamber 22.

A piston 56 having a cylindrical shape is slidably disposed in each of the cylindrical bores 52 of the cylinders 42, 44 and extending outwardly from the open distal end 50 of the cylindrical bore 52. The piston 56 presents an annular flange 58 and a piston wall 60 extending cylindrically and axially from the annular flange 58 to a distal end 62 defining an inner chamber 64 extending between the annular flange 58 and the piston wall 60. The piston wall 60 of the piston 56 defines a plurality of holes 66 for facilitating fluid flow between the chamber 22 of the housing 20 and the inner chamber 64 of the piston 56. A spring 68 is disposed inside the inner chamber 64 of the piston 56 in engagement with the annular flange 58 of the piston 56 and in engagement with the spring seat 46 of the cylinders 42, 44. Alternatively, instead of being disposed in the inner chamber 64 of the piston 56, the spring 68 can be dispose on the outside of the piston 56 surrounding the piston 56 and abutting the open distal end 50 of the cylinders 42, 44.

The cylindrical wall 48 of the cylinders 42, 44 includes a cylinder ramp 70 presenting a first frusto-conical surface 72 extending annularly about the cylindrical wall 48 of the cylinders 42, 44 in a perpendicular relationship and radially inward toward the axis A to define a cylinder ramp shoulder 74. The distal end 62 of the piston wall 60 includes a piston ramp 76 presenting a second frusto-conical surface 78 extending annularly about the distal end 62 of side piston wall 60 in a perpendicular relationship and radially outward away from the axis A to define a piston ramp shoulder 80. The piston 56 includes a relief 82 allowing the piston ramp 76 of the piston 56 to compress radially as the piston ramp 76 engaging the cylinder ramp 70 of the cylinders 42, 44 and expand to an interlocking engagement between the piston ramp shoulder 80 and the cylinder ramp shoulder 74. In other words, the relief 82 allows the piston ramp 76 to compress radially upon engaging the cylinder ramp 70 and expand radially after engaging the cylinder ramp 70 allowing the piston ramp shoulder 80 and the cylinder ramp shoulder 74 to interlock with one another. The relief 82 may be a plurality of slots disposed on the piston wall 60 of the piston 56 extending along the axis A from the distal end 62 of the piston wall 60 toward the annular flange 58 of the piston 56.

The piston ramp shoulder 80 of the piston 56 and the cylinder ramp shoulder 74 of the cylinders 42, 44 radially engage one another in an assembled position 84 to allow the cylinders 42, 44 and the pistons 56 to abut one another during the sliding movement axially along the axis A within the chamber 22 of the housing 20. The cylinder ramp 70 and the piston ramp 76 present opposing frusto-conical surfaces 72, 78 for slidably engaging one another axially to radially compress the distal end 62 of the piston 56 and snap into the assembled position 84. In other words, the interlocking engagement between the cylinder ramp shoulder 74 and the piston ramp shoulder 80 allows the piston 56 to move axially along the axis A within the cylindrical wall 48 of the cylinders 42, 44. Alternatively, instead of radial ramps 70, 76, the interlocking engagement between the piston 56 and the cylinders 42, 44 can be achieved by radial flanges extending from the piston wall 60 and the cylinder wall 28.

While the invention has been described with reference to an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

ELEMENT LIST

| Element Symbol | Element Name |
| --- | --- |
| A | Axis |
| 20 | Housing |
| 22 | Chamber |
| 24 | Open End |
| 26 | Closed End |
| 28 | Wall |
| 30 | Top |
| 32 | Fluid Reservoir |
| 34 | Annular Recess |
| 36 | Fluid Channel |
| 38 | Sealing Groove |
| 40 | Annular Seal |
| 42 | First Cylinder |
| 44 | Second Cylinder |
| 46 | Spring Seat |
| 48 | Cylindrical Wall |
| 50 | Open Distal End |
| 52 | Cylindrical Bore |
| 54 | Fluid Flow Aperture |
| 56 | Piston |
| 58 | Annular Flange |
| 60 | Piston Wall |
| 62 | Distal End |
| 64 | Inner Chamber |
| 66 | Holes |
| 68 | Spring |
| 70 | Cylinder Ramp |
| 72 | First Frusto-Conical Surface |
| 74 | Cylinder Ramp Shoulder |
| 76 | Piston Ramp |
| 78 | Second Frusto-Conical Surface |
| 80 | Piston Ramp Shoulder |
| 82 | Relief |
| 84 | Assembled Position |

The invention claimed is:

1. A master cylinder assembly in a brake system;
a housing disposed along an axis defining a chamber extending between an open end and a closed end to define a wall extending annularly in said chamber,
a cylinder disposed for sliding movement axially along said axis in said chamber including a cylindrical wall extending axially to an open distal end with a plurality of fluid flow apertures located closely adjacent said open distal end,
a piston including a piston wall extending cylindrically and axially to a distal end,
said cylindrical wall of said cylinder including a cylinder ramp having an axial length and presenting a first frusto-conical surface extending annularly about said cylindrical wall of said cylinder to define a cylinder ramp shoulder, wherein said cylinder ramp is spaced from said open end of said cylinder with said plurality of fluid flow apertures located between said cylinder ramp and said open distal end of said cylinder,
said distal end of said piston wall including a piston ramp presenting a second frusto-conical surface extending annularly about said piston wall and tapering radially inwardly toward said axis at a constant angle and wherein said piston ramp further defines a piston ramp shoulder so that said frusto-conical surfaces slidably engage one another to radially compress said distal end of said piston and snap into an assembled position wherein said shoulders radially engage one another to limit the axial movement of the piston relative to the cylinder,
a spring captured inside said piston and in contact with a spring seat located within said cylinder, said spring biasing said cylinder ramp shoulder and said piston ramp shoulder against each other, and
an annular seal located in an annular groove in said housing, said seal in alignment with said plurality of fluid flow apertures in said open distal end of said cylinder when said spring fully biases said shoulders against each other thereby sealing said fluid flow apertures.

2. An assembly as set forth in claim 1 wherein said piston includes a relief allowing said piston ramp of said piston to compress radially as said piston ramp engages said cylinder ramp of said cylinder and to expand to an interlocking engagement between said piston ramp shoulder and said cylinder ramp shoulder.

3. An assembly as set forth in claim 1 wherein said first frusto-conical surface and said second frusto-conical surface are opposite angled surfaces.

4. An assembly as set forth in claim 1 wherein said cylinder includes an end portion and said piston wall extending cylindrically and axially from said end portion defining an inner chamber extending between said end portion and said piston wall.

5. An assembly as set forth in claim 4 wherein said piston includes a plurality of holes for facilitating fluid flow between said chamber of said housing and said inner chamber of said piston.

6. An assembly as set forth in claim 4 wherein said end portion is an annular flange that extends radially inwardly from said piston wall to an edge that defines an opening into said inner chamber.

7. An assembly as set forth in claim 6 wherein said edge of said annular flange tapers radially inwardly toward said axis between said distal end and said inner chamber.

8. An assembly as set forth in claim 4 wherein said cylindrical wall extends outwardly from said spring seat thereby defining said cylindrical bore extending between said cylindrical wall and said spring seat.

9. An assembly as set forth in claim 1 wherein said piston ramp extends annularly about said distal end of said piston wall to define said piston ramp shoulder.

10. An assembly as set forth in claim 1 wherein said housing defines a top including a plurality of fluid reservoirs.

11. An assembly as set forth in claim 10 wherein said wall of said housing includes a plurality of annular recesses.

12. An assembly as set forth in claim 11 wherein said top of said housing defines a fluid channel interconnecting each of said annular recesses to said fluid reservoir for facilitating fluid flow between each of said fluid reservoirs and said chamber.

13. An assembly as set forth in claim 1 wherein said wall of said housing includes a plurality of sealing grooves disposed and spaced annularly along said wall.

14. An assembly as set forth in claim 13 including an annular seal disposed in each of said grooves.

15. A master cylinder assembly in a brake system comprising;
 a housing disposed along an axis defining a chamber of generally cylindrical shape extending horizontally between an open end and a closed end to define a wall extending annularly in said chamber of said housing,
 said housing defining a top including a plurality of fluid reservoirs,
 said wall of said housing defining a plurality of annular recesses,
 said top of said housing defining a fluid channel interconnecting each of said annular recesses to said fluid reservoir for facilitating fluid flow between each of said fluid reservoirs and said chamber,
 said wall of said housing including a plurality of sealing grooves disposed and spaced annularly along said wall,
 an annular seal disposed in each of said grooves,
 a first cylinder and a second cylinder disposed for sliding movement axially along said axis and slidably in said chamber in an end-to-end relationship,
 each of said cylinders including a spring seat and a cylindrical wall extending outwardly from said spring seat to an open distal end defining a cylindrical bore extending between said spring seat and said cylindrical wall wherein said cylindrical wall of said cylinders is in communication with said wall of said housing,
 said cylindrical wall of each of said cylinders defining a plurality of fluid flow apertures closely adjacent to said open distal end,
 a piston of generally cylindrical shape slidably disposed in each of said cylindrical bores of said cylinders and extending outwardly from said open distal end of said cylindrical bore,
 said piston presenting an annular flange and a piston wall extending cylindrically and axially from said annular flange to a distal end defining an inner chamber extending between said annular flange and said piston wall,
 said piston wall of said piston defining a plurality of holes for facilitating fluid flow between said chamber of said housing and said inner chamber of said piston,
 a spring disposed inside of said piston and in contact with said spring seat of said cylinder,
 said cylindrical wall of said cylinders including a cylinder ramp having an axial length and presenting a first frusto-conical surface extending annularly about said cylindrical wall of said cylinders in a perpendicular relationship and radially inward toward said axis to define a cylinder ramp shoulder, wherein said cylinder ramp is spaced from said open distal end of said cylinder with said plurality of fluid flow apertures located between said open distal end and said cylinder ramp,
 said distal end of said piston wall including a piston ramp presenting a second frusto-conical surface extending annularly about said distal end of side piston wall and tapering radially inwardly toward said axis at a constant angle and wherein said piston ramp further defines a piston ramp shoulder in perpendicular relationship to said axis,
 said piston including a relief allowing said piston ramp of said piston to compress radially inwardly as said piston ramp is engaging said cylinder ramp of said cylinders and to expand to an interlocking engagement between said piston ramp shoulder and said cylinder ramp shoulder once said piston ramp shoulder passes said cylinder ramp shoulder,
 said piston ramp shoulder of said piston and said cylinder ramp shoulder of said cylinders biased against each other by said spring and radially engaging one another in an assembled position to allow said cylinders and said pistons to abut one another during said sliding movement axially along said axis within said chamber of said housing,
 said cylinder ramp and said piston ramp presenting opposing frusto-conical surfaces for slidably engaging one another axially to radially compress said distal end of said piston and snap into said assembled position, and
 at least one of said annular seals in alignment with said plurality of fluid flow apertures in each of said cylinders when said spring fully biases said shoulders against each other thereby sealing said fluid flow apertures.

16. An assembly as set forth in claim 15 wherein said annular flange extends radially inwardly from said piston wall to an edge and defines an opening into said inner chamber, and wherein said edge of said annular flange tapers radially inwardly toward said axis between said distal end and said inner chamber.

* * * * *